(12) United States Patent
Panje et al.

(10) Patent No.: US 11,870,878 B2
(45) Date of Patent: Jan. 9, 2024

(54) ENHANCING TRANSMISSION EFFICIENCY OF ELECTRONIC DEVICES IN A WIRELESS NETWORK

(71) Applicant: ARRIS Enterprises LLC, Suwanee, GA (US)

(72) Inventors: Krishna Prasad Panje, Karnataka (IN); Lakshmi Arunkumar, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 321 days.

(21) Appl. No.: 17/407,695

(22) Filed: Aug. 20, 2021

(65) Prior Publication Data

US 2022/0109744 A1 Apr. 7, 2022

Related U.S. Application Data

(60) Provisional application No. 63/088,531, filed on Oct. 7, 2020.

(51) Int. Cl.
*H04L 69/18* (2022.01)
*H04W 16/26* (2009.01)
*H04W 80/06* (2009.01)

(52) U.S. Cl.
CPC ............. *H04L 69/18* (2013.01); *H04W 80/06* (2013.01); *H04W 16/26* (2013.01)

(58) Field of Classification Search
None
See application file for complete search history.

(56) References Cited

U.S. PATENT DOCUMENTS

| 9,391,878 B2 * | 7/2016 | Bade ....................... H04L 45/30 |
| 10,033,489 B1 * | 7/2018 | DeMarco ................ H04L 69/16 |
| 2023/0164630 A1 * | 5/2023 | Lin ....................... H04W 76/16 370/329 |

* cited by examiner

*Primary Examiner* — Robert M Morlan
(74) *Attorney, Agent, or Firm* — Wenderoth, Lind & Ponack, L.L.P.

(57) ABSTRACT

An electronic device in a network capable of enhancing transmission efficiency of other electronic devices in the network is provided. The electronic device includes a network interface, a non-transitory memory having instructions stored thereon, and a hardware processor. The hardware processor is configured to execute the instructions to request transmission of data from another electronic device in the wireless network. Moreover, the hardware processor is configured to execute the instructions to receive, using the network interface, the data from the other electronic device using a first protocol, and determine a condition of a transmission delay of the data. In response to determining the condition of the transmission delay, an instruction is transmitted to the other electronic device to retransmit the data using a second protocol. The data is received from the other electronic device using the second protocol.

21 Claims, 5 Drawing Sheets

ENHANCING TRANSMISSION EFFICIENCY OF ELECTRONIC DEVICES IN A WIRELESS NETWORK

TECHNICAL FIELD

The subject matter of the present disclosure relates generally to enhancing transmission efficiency of electronic devices in a wireless network.

BACKGROUND

There has been a rapid rise in the use of wireless devices in wireless networks, which has increased traffic drastically, degraded the quality of service, and reduced the coverage capabilities of many network devices (e.g., gateway devices, access points, and wireless extenders). The wireless industry recognized these issues and developed standards for wireless routing protocols such as a multi-access point (MAP) or mesh protocol, which allows for wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device. The MAP controller typically runs on the gateway device but may also run on devices in the cloud.

Occasionally, the MAP controller has difficulty obtaining data timely from electronic devices in a wireless network. Not being able to timely obtain data from electronic devices in the network can be frustrating and is inconvenient for users. Therefore, known techniques or protocols for timely obtaining data from electronic devices in a wireless network have drawbacks.

Thus, it would be advantageous and an improvement over the relevant technology to provide an apparatus, method, and computer-readable recording medium capable of configuring an electronic device, for example, an access point or a wireless extender, to transmit data using a more efficient technique or protocol.

SUMMARY

An aspect of the present disclosure provides an electronic device in a network capable of enhancing transmission efficiency of other electronic devices in the network. The electronic device includes a network interface, a non-transitory memory having instructions stored thereon, and a hardware processor. The hardware processor is configured to execute the instructions to request, using the network interface, transmission of data from another electronic device in the wireless network, and to receive, using the network interface, the data from the other electronic device using a first protocol.

Moreover, the hardware processor is configured to execute the instructions to determine a condition of a transmission delay of the data. In response to determining the condition of the transmission delay, the hardware processor is configured to execute the instructions to transmit, using the network interface, an instruction to the other electronic device to retransmit the data using a second protocol, and to receive, using the network interface, the data from the other electronic device using the second protocol.

In an aspect of the present disclosure the hardware processor is further configured to execute the instructions to determine a condition of the transmission delay based on receipt, using the network interface, of the data from the other electronic device within a predetermined time period.

In an aspect of the present disclosure, the hardware processor is further configured to execute the instructions to determine a condition that enhanced security is needed for transmitting the data, and transmit, using the network interface, the instruction to the second electronic device using the second protocol. The second protocol is transmission control protocol (TCP) or WebSocket protocol.

An aspect of the present disclosure provides a method of enhancing transmission efficiency of electronic devices in a wireless network that includes requesting, by a first electronic device, transmission of data from a second electronic device in the wireless network, and receiving, by the first electronic device, the data from the second electronic device using a first protocol. Moreover, the method includes determining, using the first electronic device, a condition of a transmission delay of the data, and in response to determining the condition of the transmission delay, transmitting an instruction from the first electronic device to the second electronic device to retransmit the data using a second protocol. Further, the method includes receiving, by the first electronic device, the data from the second electronic device using the second protocol.

In another aspect of the present disclosure, the transmission delay is determined based on receiving the data from the second electronic device within a predetermined time period.

In another aspect of the present disclosure the method further includes determining a condition that enhanced security is needed for transmitting the data, and transmitting the instruction to the second electronic device using the second protocol. The second protocol is TCP or WebSocket protocol.

An aspect of the present disclosure provides a non-transitory computer-readable recording medium in a first electronic device in a network capable of enhancing transmission efficiency of other electronic devices in the network. The non-transitory computer-readable recording medium stores instructions which when executed by a hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
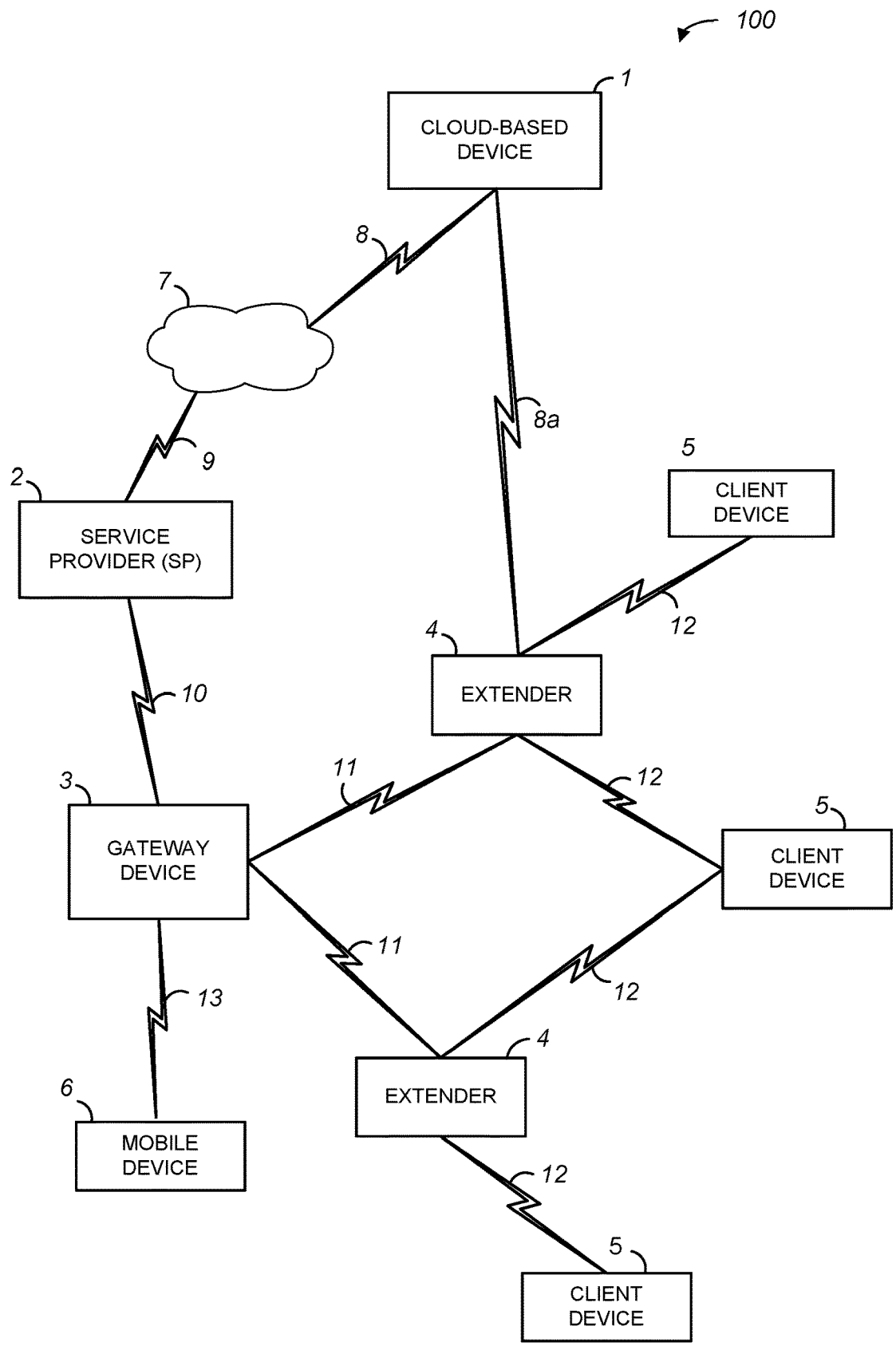
FIG. 1 is a schematic diagram illustrating an exemplary system for enhancing transmission efficiency of electronic devices in a network.

FIG. 1 is a schematic diagram of an exemplary system 100 for configuring electronic devices in a network. As shown in FIG. 1, the main elements of the system 100 include a cloud-based device 1 and a service provider (SP) 2 communicatively connected via the Internet 7, as well as a gateway device 3 communicatively connected to the Internet 7 via the SP 2 and also connected to different wireless devices such as Wi-Fi extenders 4, client devices 5, and a mobile device 6.

The system 100 shown in FIG. 1 includes wireless devices (e.g., extenders 4, client devices 5, and mobile device 6) that may be connected in one or more wireless networks (e.g., private, guest, iControl, backhaul network, or Internet of things (IoT) networks) within the system 100. Additionally, there could be some overlap between devices in the different networks. That is, one or more network devices could be located in more than one network. For example, wireless extenders 4 could be located both in a private network for providing content and information to a client device and also in a backhaul network.

In FIG. 1, the cloud-based device 1 can be, for example, a network server or personal computer (PC) having a network controller for assisting, if necessary, in the management (e.g., steering/roaming) of wireless devices in the system 100. The SP 2 can be, for example, a streaming video provider or any computer for connecting the gateway device 3 to the Internet 7.

The connection 8 between the cloud-based device 1 and the Internet 7, the connection 8a between the cloud-based device 1 and a wireless extender 4, the connection 9 between the Internet 7 and the SP 2, and the connection 10 between the SP 2 and the gateway device 3 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 10 can further include as some portion thereof a broadband mobile phone network connection, an optical network connection, or other similar connections. For example, the connection 10 can also be implemented using a fixed wireless connection that operates in accordance with, but is not limited to, 3rd Generation Partnership Project (3GPP) Long Term Evolution (LTE) or 5G protocols.

The gateway device 3 is a hardware electronic device that performs the function of a stand-alone cable modem or a combination modem and gateway device that combines the functions of a modem, access point, and/or a router for providing received content to network devices (e.g., client devices 5, wireless extenders 4 and mobile device 6) in the system 100. It is also contemplated by the present disclosure that the gateway device 3 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The gateway device 3 is connected to the wireless extenders 4 via connection 11. The connection 11 between the gateway device 3 and the wireless extenders 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands.

Additionally, the connection 11 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 11 can include connections to a media over coax (MoCA) network. One or more of the connections 11 can also be a wired Ethernet connection.

The wireless extenders 4 can be, for example, hardware electronic devices such as access points used to extend the wireless network by receiving the signals transmitted by the gateway device 3 and rebroadcasting the signals to, for example, client devices 5, which may be out of range of the gateway device 3. The wireless extenders 4 can also receive signals from the client devices 5 and rebroadcast the signals to the gateway device 3 or other client devices 5.

The connection 12 between the wireless extenders 4 and the client devices 5 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 12 may be implemented using a wireless connection that operates in accordance with, but is not limited to, RF4CE protocol, ZigBee protocol, Z-Wave protocol, or IEEE 802.15.4 protocol. Also, one or more of the connections 12 can also be a wired Ethernet connection.

The client devices 5 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device 3. Additionally, the client devices 5 can be a TV, an IP/QAM STB or an SMD that is capable of decoding audio/video content, and playing over OTT or MSO provided content received through the gateway device 3.

The connection 13 between the gateway device 3 and the mobile device 6 may be implemented through a wireless connection that operates in accordance with, but is not limited to, IEEE 802.11 protocol. The connection 12 may also be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as a CBRS band, 2.4 GHz bands, 5 GHz bands, 6 GHz bands, or 60 GHz bands. The connection 13 between the gateway device 3 and the mobile device 6 may also be implemented through a WAN, a LAN, a VPN, MANs, WLANs, SANs, a DOCSIS network, a fiber optics network (such as FTTH, FTTX, or HFC), a PSDN, a global Telex network, or a 2G, 3G, 4G or 5G network, for example. The connection 13 can also be a wired Ethernet connection.

The mobile device 6 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnecting with other devices via Wi-Fi and Bluetooth protocols.

Figure 2:
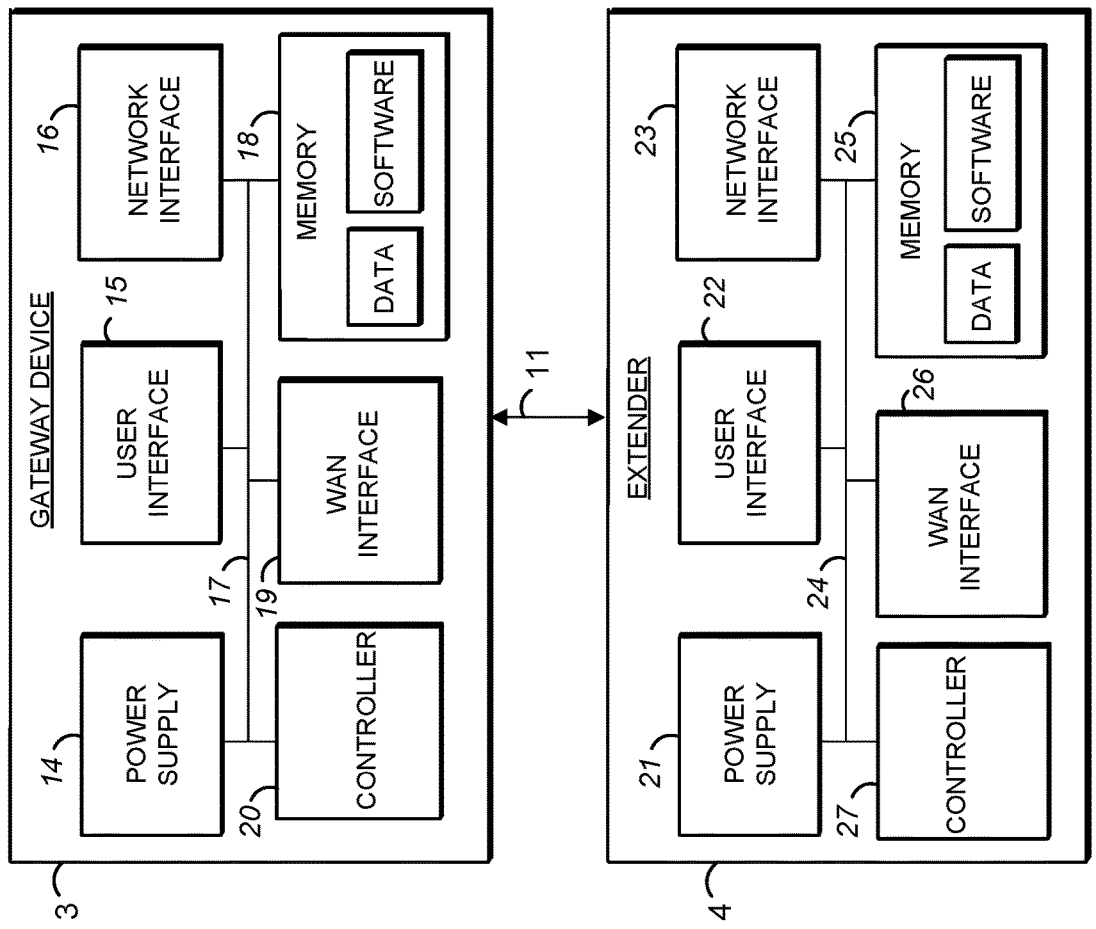
FIG. 2 is a more detailed schematic diagram illustrating an exemplary gateway device and an exemplary wireless extender in the system of FIG. 1.

A detailed description of the example internal components of the gateway device 3 and the extenders 4 shown in FIG. 1 will be provided in the discussion of FIG. 2. However, in general, it is contemplated by the present disclosure that the gateway device 3 and the wireless extenders 4 include electronic components or electronic computing devices operable to receive, transmit, process, store, and/or manage data and information associated with the system 100, which encompasses any suitable processing device adapted to perform computing tasks consistent with the execution of computer-readable instructions stored in a memory or a computer-readable recording medium.

Further, any, all, or some of the computing devices in the gateway device 3 and the wireless extenders 4 may be adapted to execute any operating system, including Linux, UNIX, Windows, MacOS, DOS, and ChromeOS as well as virtual machines adapted to virtualize execution of a particular operating system, including customized and proprietary operating systems. The gateway device 3 and the extenders 4 are further equipped with components to facilitate communication with other computing devices over the one or more network connections to local and wide area networks, wireless and wired networks, public and private networks, and any other communication network enabling communication in the system 100.

The respective connections 8, 8a, 9, 10 between the cloud-based device 1 and the Internet 7, between the cloud-based device 1 and the wireless extender 4, between the Internet 7 and the SP 2, and between the SP 2 and the gateway device 3 shown in FIG. 1 are meant to be exemplary connections and are not meant to indicate all possible connections between the cloud-based device 1, the Internet 7, the SP 2, and the gateway device 3. Additionally, the respective connections 11 between the gateway device 3 and the wireless extenders 4 shown in FIG. 1 are meant to be exemplary connections and are not meant to indicate all possible connections between the gateway device 3 and the wireless extenders 4. Likewise, the connections 12 between the extenders 4 and the client devices 5 shown in FIG. 1 are meant to be exemplary connections and are not meant to indicate all possible connections between the wireless extenders 4 and client devices 5. Similarly, the connection 13 between the gateway device 3 and the mobile device 6 shown in FIG. 1 is meant to be an exemplary connection and not meant to indicate all possible connections between the gateway device 3 and the mobile device 6.

It is contemplated by the present disclosure that the number of cloud-based devices 1, SPs 2, gateway devices 3, wireless extenders 4, client devices 5, and mobile devices 6 is not limited to the number of cloud-based devices 1, SPs 2, gateway devices 3, wireless extenders 4, client devices 5, and mobile devices 6 shown in FIG. 1.

FIG. 2 illustrates a more detailed schematic diagram of an example gateway device 3 and an example extender 4 in the system 100 for enhancing configuration of electronic devices according to an embodiment of the present disclosure. Although FIG. 2 shows one wireless extender 4, the wireless extender 4 in the figure is meant to be representative of the other wireless extenders 4 shown in FIG. 1.

The gateway device 3 is a hardware electronic device that performs the function of a stand-alone cable modem or a combination modem and gateway device that combines the functions of a modem, access point and/or a router for providing received content to network devices (e.g., client devices 5, wireless extenders 4, and mobile device 6) in the system 100. It is also contemplated by the present disclosure that the gateway device 3 can include the function of, but is not limited to, an IP/QAM STB or SMD that is capable of decoding audio/video content, and playing OTT or MSO provided content. As shown in FIG. 2, the gateway device 3 includes a power supply 14, user interface 15, a network interface 16, a memory 18, a WAN interface 19 and a controller 20.

The power supply 14 supplies power to the internal components of the gateway device 3 through the internal bus 17. The power supply 14 can be a self-contained power source such as a battery pack with an interface to be powered through an electrical charger connected to an outlet (e.g., either directly or by way of another device).

The user interface 15 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the gateway device 3.

The network interface 16 includes various network cards, and circuitry implemented in software and/or hardware to enable communications using the communication protocols of connections 11 and 13 (e.g., as previously described with reference to FIG. 1).

The memory 18 includes a single memory or one or more memories or memory locations that include, but are not limited to, a random access memory (RAM), a dynamic random access memory (DRAM), a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 18 can be used to store any type of data, including, but not limited to, instructions used to configure or reconfigure electronic devices, for example, the wireless extenders 4 in the system 100. The configuration instruction may facilitate, for example, configuring the wireless extender 4 to transmit data using a user datagram protocol (UDP) port or a transmission control protocol (TCP) port of the wireless extender 4, or to simultaneously transmit data using a combination of the UDP port and the TCP port of the wireless extender 4. The transmitted data may be secure and/or insecure data. For example, the secure data can be received using the TCP port of the gateway device 3 while insecure data can be received using the UDP port of the gateway device 3.

Insecure data includes, but is not limited to, a number of connected client devices 5, a received signal strength indicator (RSSI) of the client devices 5, and data transmission and reception rates for the client devices 5. Secure data includes, but is not limited to, media access control (MAC) addresses or unique identifiers or names of the client devices 5, service set identifiers (SSID), credentials, and domain names.

Additionally, the memory 18 can be used to store any type of instructions and/or software, for example, multi-access point (MAP) software or mesh protocol software or other similar software which allows for wireless devices to communicate with each other using optimal paths for relaying data in a wireless network. The MAP or mesh protocols define the control protocols and the data objects necessary to enable onboarding, provisioning, control, and management of wireless devices in a wireless network. Moreover, the memory 18 can be used to store instructions and/or software, for example simple network management protocol (SNMP) software or other software which enables the gateway device 3 to support the use of the same or similar protocol such as the SNMP protocol. Furthermore, the memory 18 can be used to store any type of instructions and/or software associated with algorithms, processes, or operations for controlling the general functions and operations of the gateway device 3.

The WAN interface 19 may include various network cards and circuitry implemented in software and/or hardware to enable communications between the gateway device 3 and the SP 2 using communications protocols in accordance with connection 10 (e.g., as previously described with reference to FIG. 1).

The controller 20 controls the general operations of the gateway device 3 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 3. Communication between the components (e.g., 14-16 and 18-20) of the gateway device 3 is established using the internal bus 17.

It is contemplated by the present disclosure that the cloud-based device 1 has similar structure and functionality as the gateway device 3. Thus, it should be understood that the cloud-based device 1 may store the same or similar data and software as the gateway device 3 which enable performing the same or substantially the same functions as the gateway device 3. Moreover, the cloud-based device 1 may transmit instructions for configuring electronic devices such as, for example, wireless extenders 4 to use a secure protocol, for example, the WebSocket protocol instead of hypertext transfer protocol secure (HTTPS) when transmitted data requires enhanced security or when data transmission efficiency is to be enhanced. The cloud-based device 1 may transmit the configuration instructions directly or indirectly via the gateway device 3 to the wireless extenders 4.

The WebSocket protocol enables interaction between a web browser, or other client applications, and a web server. Using the WebSocket protocol may enhance data transmission efficiency by more than fifty percent versus using HTTP representational state transfer (REST) Application Program Interface (API).

The wireless extender 4 can be, for example, a hardware electronic device such as an access point used to extend the wireless network by receiving the signals transmitted by the gateway device 3 and rebroadcasting the signals to, for example, client devices 5, which may be out of range of the gateway device 3. The wireless extender 4 can also receive signals from the client devices 5 and rebroadcast the signals to the gateway device 3 or other client devices 5. As shown in FIG. 2, the wireless extender 4 includes a power supply 21, user interface 22, network interface 23, a memory 25, a WAN interface 26, and a controller 27.

The power supply 21 supplies power to the internal components of the wireless extender 4 through an internal bus 24. The power supply 21 can be a self-contained power source such as a battery pack with an interface to be powered through an electrical charger connected to an outlet (e.g., either directly or by way of another device). The power supply 21 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 22 includes, but is not limited to, push buttons, a keyboard, a keypad, a LCD, a TFT, a LED, a HD or other similar display device including a display device having touch screen capabilities so as to allow interaction between a user and the wireless extender 4.

The network interface 23 includes various network cards, interfaces, and circuitry implemented in software and/or hardware to enable communications using the wireless protocols of connections 11 and 12 (e.g., as previously described with reference to FIG. 1).

The memory 25 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, a hard disk or any other various layers of memory hierarchy. The memory 25 can be used to store any type of data, for example, secure and insecure data, as well as configuration instructions received, for example, from the gateway device 3 to facilitate configuring the wireless extender 4 to transmit insecure data using, for example, a UDP port of the wireless extender 4. The configuration instructions may additionally facilitate configuring the wireless extender 4 to transmit secure data using, for example, a TCP port of the wireless extender 4 such that the wireless extender 4 may simultaneously transmit insecure data via the UDP port and secure data via the TCP port.

The memory 25 may also store configuration instructions for configuring the wireless extender 4 to use a secure protocol, for example, the WebSocket protocol instead of hypertext transfer protocol secure (HTTPS) when transmitted data requires enhanced security or when data transmission efficiency is to be enhanced. The configuration instructions may be transmitted directly to the wireless extender 4 from the cloud-based device 1 using the connection 8a or may be indirectly transmitted from the cloud-based device 1 to the wireless extender 4 via the gateway device 3. Additionally, the memory 25 may also be used to store any type of instructions and/or software associated with algorithms, processes, or operations for controlling the general functions and operations of the wireless extender 4.

The WAN interface 26 may include various network cards and circuitry implemented in software and/or hardware to enable communications between the wireless extender 4 and the cloud-based device 1 using communications protocols in accordance with connection 8a (e.g., as previously described with reference to FIG. 1).

The controller 27 controls the general operations of the wireless extender 4 and includes, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the wireless extender 4. Communication between the components (e.g., 21-23 and 25-27) of the wireless extender 4 is established using the internal bus 24.

Occasionally, the gateway device 3 has difficulty obtaining certain requested data from electronic devices, for example, wireless extenders 4 in the system 100. For example, the gateway device 3 may request a wireless extender 4 to transmit data via a first protocol, for example, TCP and the gateway device 3 may receive the requested data. However, the gateway device 3 may have difficulty receiving the transmitted data or the received data may be corrupted. The gateway device 3 may have difficulty receiving the transmitted data due to a delay caused by, for example, a bad Internet connection or for any other reason. Not being able to obtain data from the wireless extenders 4, or not being able to timely obtain data from the wireless extender 4 wastes time and is frustrating and inconvenient for users.

To address this problem, configuration instructions are transmitted to the wireless extender 4 that facilitate configuring the wireless extender 4 to transmit data using a second protocol, for example, UDP via a UDP port of the wireless extender 4, which is a protocol that facilitates faster and more efficient data transmission. Additionally, the instructions may facilitate configuring the wireless extender 4 to transmit secure data using a TCP port of the wireless extender 4. The wireless extender 4 may simultaneously transmit secure data via the TCP port and insecure data via the UDP port.

Insecure data includes, but is not limited to, a number of connected devices, a received signal strength indicator (RSSI) of the client devices 5, and data transmission and reception rates for the client devices 5. Secure data includes, but is not limited to, media access control (MAC) addresses or unique identifiers or names of the client devices 5, service set identifiers (SSID), credentials, and domain names.

When data transmitted to the cloud-based device 1 requires enhanced security or when data transmission efficiency is to be enhanced, different instructions may be transmitted to the wireless extender 4 from the cloud-based device 1 that facilitate configuring the wireless extender 4 to use the WebSocket protocol to transmit secure data. As a result, the gateway device 3, and additionally or alternatively the cloud-based device 1, are facilitated to efficiently obtain data from the wireless extender 4, which facilitates reducing wasted time and user frustration and inconvenience.

Figure 3:
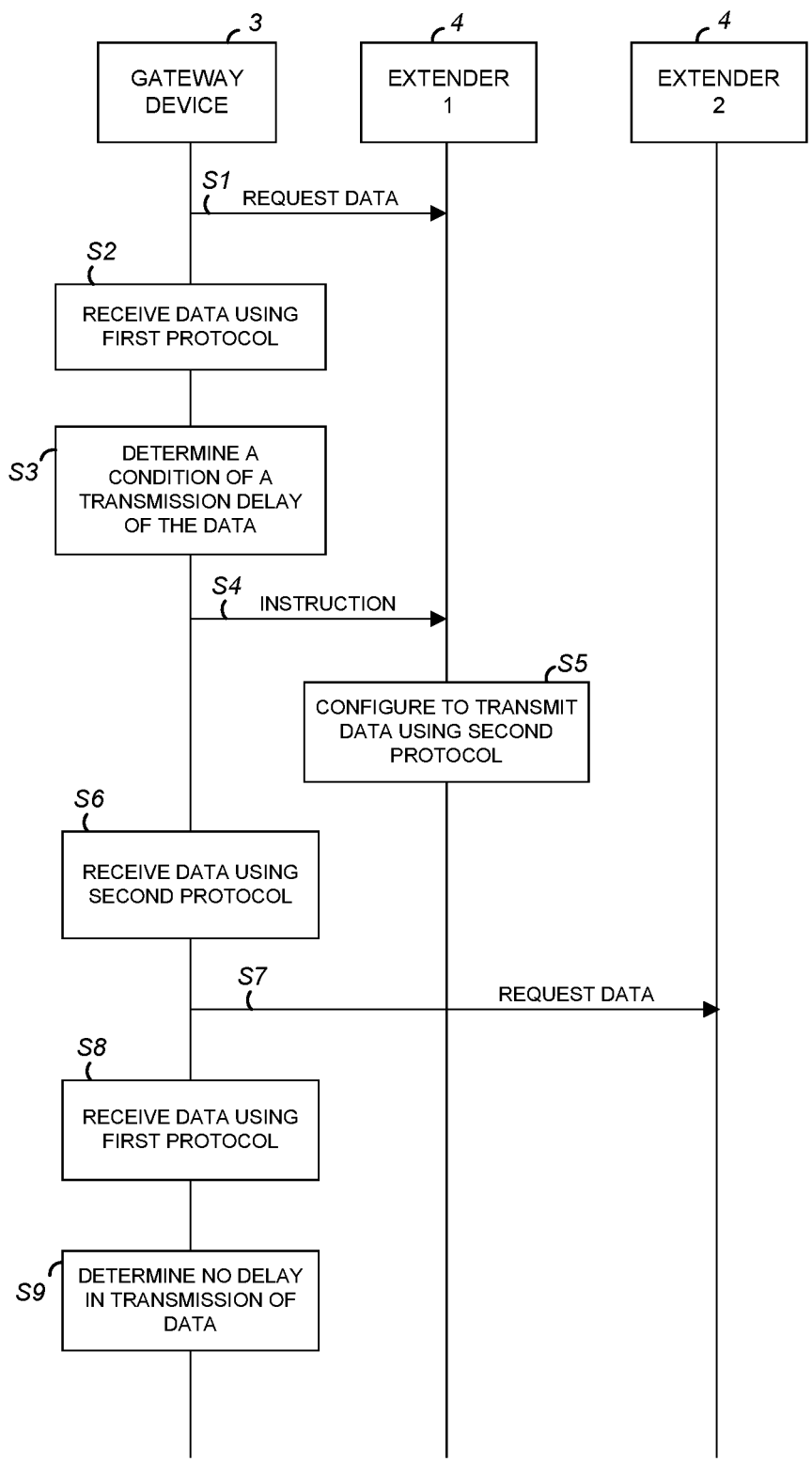
FIG. 3 is an exemplary method and algorithm for enhancing transmission efficiency of electronic devices in the network.

FIG. 3 is an exemplary method and algorithm for enhancing transmission efficiency of electronic devices in the system 100 in accordance with an embodiment of the present disclosure. FIG. 3 illustrates the gateway device 3, a first wireless extender 4 designated with the number one (1), and a second wireless extender 4 designated with the number two (2). FIG. 3 illustrates exemplary operations performed by the gateway device 3 and the first wireless extender 4 when the gateway device 3 has difficulty obtaining requested data from the first wireless extender 4. Moreover, FIG. 3 illustrates exemplary operations performed by the gateway device 3 and the second wireless extender 4 when there is no difficulty obtaining the requested data from the second wireless extender 4. Additionally, the exemplary method and algorithm of FIG. 3 includes operations that are performed by the software executed by the controller 20 of the gateway device 3 and by the controller 27 of the wireless extender 4.

In step S1, the software executed by the controller 20 causes the gateway device 3 to transmit a request for data via a first protocol, for example, TCP using the network interface 16 and the connection 11. The data may be received from the first wireless extender 4 using, for example, TCP using the network interface 16 and the connection 11. Next, in step S2, the gateway device 3 receives the data via the first protocol using the network interface 16 and the connection 11. In step S3, the gateway device 3 determines a condition of a transmission delay of the data. The delay may be for any reason, for example, a bad Internet connection. Additionally, the gateway device 3 may determine that the received data is corrupt.

The gateway device 3 determines there is a delay in the transmission when the data is not received within a predetermined period of time. For example, the predetermined period of time may be one or more milliseconds or seconds. It is contemplated by the present disclosure that the predetermined period of time may be any period of time within which a transmission is expected to be received using a given communication protocol.

In step S4, the software executed by the controller 20 causes the gateway device 3 to transmit instructions to the first wireless extender 4. The instructions can be for configuring the first wireless extender 4 to transmit data using a second protocol, for example, user datagram protocol (UDP) via a UDP port of the first wireless extender 4. It is contemplated by the present disclosure that the UDP port of the first wireless extender 4 is used for transmitting insecure configuration data. The configuration instructions may also be for configuring the first wireless extender 4 to transmit secure data using a TCP port of the first wireless extender 4. It is contemplated by the present disclosure that the first wireless extender 4 may simultaneously transmit secure data using TCP and insecure data using UDP. Alternatively, the secure and insecure data may not be transmitted simultaneously but may be transmitted at different times.

In step S5, the software executed by the controller 27 causes the first wireless extender 4 to be configured to transmit the data using the second protocol, such as UDP. Next, in step S6, the gateway device 3 uses the network interface 16 and the connection 11 to receive the data from the first wireless extender 4 using UDP.

In step S7, the software executed by the controller 20 causes the gateway device 3 to transmit a request for data via the first protocol, TCP, to the second wireless extender 4 using the network interface 16 and the connection 11. In step S8, the gateway device 3 uses the network interface 16 and the connection 11 to receive the data from the second wireless extender 4 using the first protocol, TCP. In step S9, the gateway device 3 determines that there was no delay in the transmission of the requested data.

Figure 4:
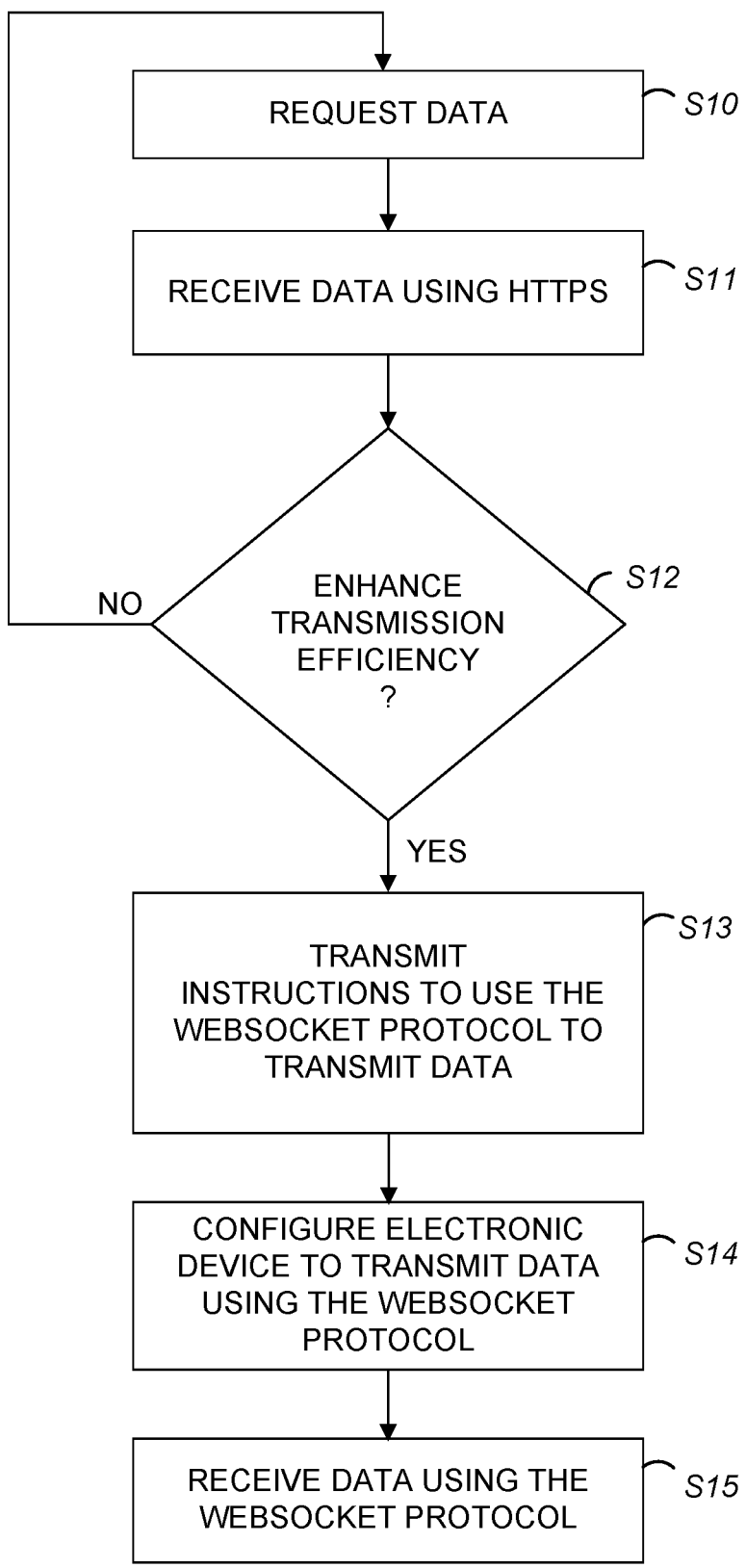
FIG. 4 is another exemplary method and algorithm for enhancing transmission efficiency of electronic devices in the network.

FIG. 4 is an exemplary method and algorithm for enhancing transmission efficiency of electronic devices in the system 100 in accordance with another embodiment of the present disclosure. FIG. 4 illustrates exemplary operations performed by the cloud-based device 1 and a wireless extender 4 for enhancing the efficiency of data transmission. It is contemplated by the present disclosure that the cloud-based device 1 includes similar internal components to the gateway device described with reference to FIG. 2.

In step S10, the cloud-based device 1 transmits a request for data via a first protocol, for example, Hypertext Transfer Protocol Secure (HTTPS) to a wireless extender 4 in the system 100. Next, in step S11, the cloud-based device 1 receives the data via HTTPS and, in step S12, the cloud-based device 1 determines whether or not transmission efficiency of the requested data is to be enhanced.

When transmission efficiency is not to be enhanced, in step S10, the cloud-based device 1 requests data. However, when the transmission efficiency is to be enhanced, in step S13, the cloud-based device 1 transmits instructions to the wireless extender 4 to use the WebSocket protocol to transmit the requested data instead of HTTPS. Using the WebSocket protocol may enhance data transmission efficiency by more than fifty percent versus using HTTP representational state transfer (REST) Application Program Interface (API).

In step S14, the wireless extender 4 is configured to transmit the requested data using the WebSocket protocol and, in step S15, the cloud-based device 1 receives the requested data using the WebSocket protocol.

Figure 5:
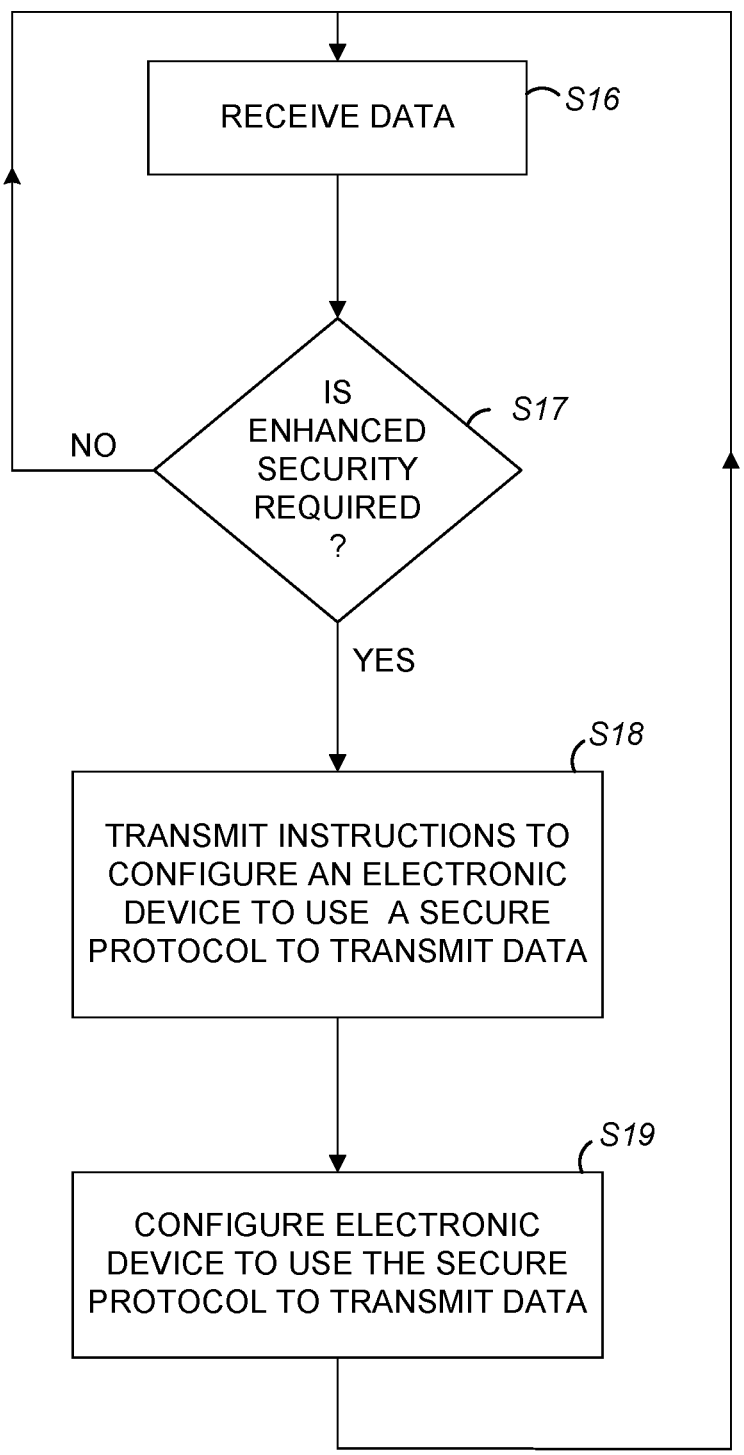
FIG. 5 is yet another exemplary method and algorithm for enhancing transmission efficiency of electronic devices in the network.

FIG. 5 is an exemplary method and algorithm for enhancing transmission efficiency of electronic devices in the system 100 in accordance with yet another embodiment of the present disclosure. FIG. 5 illustrates exemplary operations performed by a first electronic device and a second electronic device to enhance the security of data to be transmitted by the second electronic device and received by the first electronic device. The first electronic device may be, for example, the cloud-based device 1 or the gateway device 3 and the second electronic device may be, for example, a wireless extender 4 included in the system 100. Additionally, the exemplary method and algorithm of FIG. 5 includes operations that are performed by the first and second electronic devices.

In step S16, the first electronic device receives requested data from the second electronic device. In step S17, the first electronic device determines whether or not enhanced security is required for transmitting the requested data. Enhanced security is required for secure data but not for insecure data. Insecure data includes, but is not limited to, a number of connected client devices 5, a received signal strength indicator (RSSI) of the client devices 5, and data transmission and reception rates for the client devices 5. Secure data includes, but is not limited to, media access control (MAC) addresses or unique identifiers or names of the client devices 5, service set identifiers (SSID), credentials, and domain names. When the requested data does not require enhanced security, in step S16, the first electronic device receives the requested data.

However, when the requested data requires enhanced security, in step S18, the first electronic device transmits instructions to the second electronic device. The instructions are for configuring the second electronic device, for example, a wireless extender 4 to use a secure protocol to transmit the requested data.

When the first electronic device is, for example, the cloud-based device 1, the secure protocol is the WebSocket protocol. Thus, the cloud-based device 1 transmits instructions for configuring the wireless extender 4 using the WebSocket protocol. The cloud-based device 1 may transmit the instructions directly to the wireless extender 4 or indirectly via the gateway device 3. However, when the first electronic device is, for example, the gateway device 3, the secure protocol is TCP. Thus, the gateway device 3 transmits instructions for configuring the wireless extender 4 using TCP.

Next, in step S19, the second electronic device is configured according to the secure protocol to transmit the requested data.

Using the methods and algorithms for enhancing transmission efficiency of electronic devices, for example, a wireless extender in a system facilitates reducing the frustration, inconvenience, and wasted time suffered by users caused by failed data transmissions.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 3, 4, and 5. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device in a network capable of enhancing transmission efficiency of other electronic devices in the network comprising:
   a network interface;
   a non-transitory memory having instructions stored thereon; and
   a hardware processor configured to execute the instructions to:
   request, using the network interface, transmission of data from another electronic device in the wireless network;
   receive, using the network interface, the data from the other electronic device using a first protocol;
   determine a condition of a transmission delay of the data;
   in response to determining the condition of the transmission delay, transmit, using the network interface, an instruction to the other electronic device to retransmit the data using a second protocol; and
   receive, using the network interface, the data from the other electronic device using the second protocol.

2. The electronic device according to claim 1, wherein the hardware processor is further configured to execute the instructions to determine a condition of the transmission delay based on receipt, using the network interface, of the data from the other electronic device within a predetermined time period.

3. The electronic device according to claim 1, wherein the first protocol is transmission control protocol (TCP).

4. The electronic device according to claim 1, wherein the hardware processor is further configured to execute the instructions to:
   determine a condition that enhanced security is needed for transmitting the data; and
   transmit, using the network interface, the instruction to the second electronic device using the second protocol, wherein the second protocol is transfer control protocol (TCP) or WebSocket protocol.

5. The electronic device according to claim 1, wherein the second protocol is user datagram protocol (UDP).

6. The electronic device according to claim 1, wherein the electronic device is a residential gateway device and the other electronic device is an access point or wireless extender.

7. The electronic device according to claim 1, wherein the electronic device is a cloud-based device and the other electronic device is an access point or wireless extender.

8. A method of enhancing transmission efficiency of electronic devices in a wireless network comprising:
   requesting, by a first electronic device, transmission of data from a second electronic device in the wireless network;
   receiving, by the first electronic device, the data from the second electronic device using a first protocol;
   determining, using the first electronic device, a condition of a transmission delay of the data;
   in response to determining the condition of the transmission delay, transmitting an instruction from the first electronic device to the second electronic device to retransmit the data using a second protocol; and
   receiving, by the first electronic device, the data from the second electronic device using the second protocol.

9. The method according to claim 8, wherein the determining the transmission delay is based on receiving the data from the second electronic device within a predetermined time period.

10. The method according to claim 8, wherein the first protocol is TCP.

11. The method according to claim 10, further comprising:
    determining a condition that enhanced security is needed for transmitting the data; and
    transmitting the instruction to the second electronic device using the second protocol, wherein the second protocol is TCP or WebSocket protocol.

12. The method according to claim 8, wherein the second protocol is a user datagram protocol (UDP).

13. The method according to claim 8, wherein the first electronic device is a residential gateway device and the second electronic device is an access point or wireless extender.

14. The method according to claim 8, wherein the first electronic device is a cloud-based device and the second electronic device is an access point or wireless extender.

15. A non-transitory computer-readable recording medium in a first electronic device for enhancing transmission efficiency of other electronic devices in a network, the network communicatively connecting the first electronic device and one or more other electronic devices, the non-transitory computer-readable recording medium storing instructions which when executed by a hardware processor cause the non-transitory recording medium to perform steps comprising:
    requesting transmission of data from a second electronic device in the wireless network;
    receiving the data from the second electronic device using a first protocol;
    determining a condition of a transmission delay of the data;
    in response to determining the condition of the transmission delay, transmitting an instruction to the second electronic device to retransmit the data using a second protocol; and
    receiving the data from the second electronic device using the second protocol.

16. The non-transitory computer-readable recording medium according to claim 15, wherein the determining the transmission delay is based on receiving the data from the second electronic device within a predetermined time period.

17. The non-transitory computer-readable recording medium according to claim 15, wherein the first protocol is TCP.

18. The non-transitory computer-readable recording medium according to claim 17, wherein the hardware processor is further configured to perform steps comprising:
    determining a condition that enhanced security is needed for transmitting the data; and
    transmitting the instruction to the second electronic device using the second protocol, wherein the second protocol is TCP or WebSocket protocol.

19. The non-transitory computer-readable recording medium according to claim 15, wherein the second protocol is user datagram protocol (UDP).

20. The non-transitory computer-readable recording medium according to claim 15, wherein the first electronic device is a cloud-based device and the second electronic device is an access point or wireless extender.

21. The non-transitory computer-readable recording medium according to claim 15, wherein the first electronic device is a residential gateway device and the second electronic device is an access point or wireless extender.

\* \* \* \* \*